United States Patent Office 3,036,335
Patented May 29, 1962

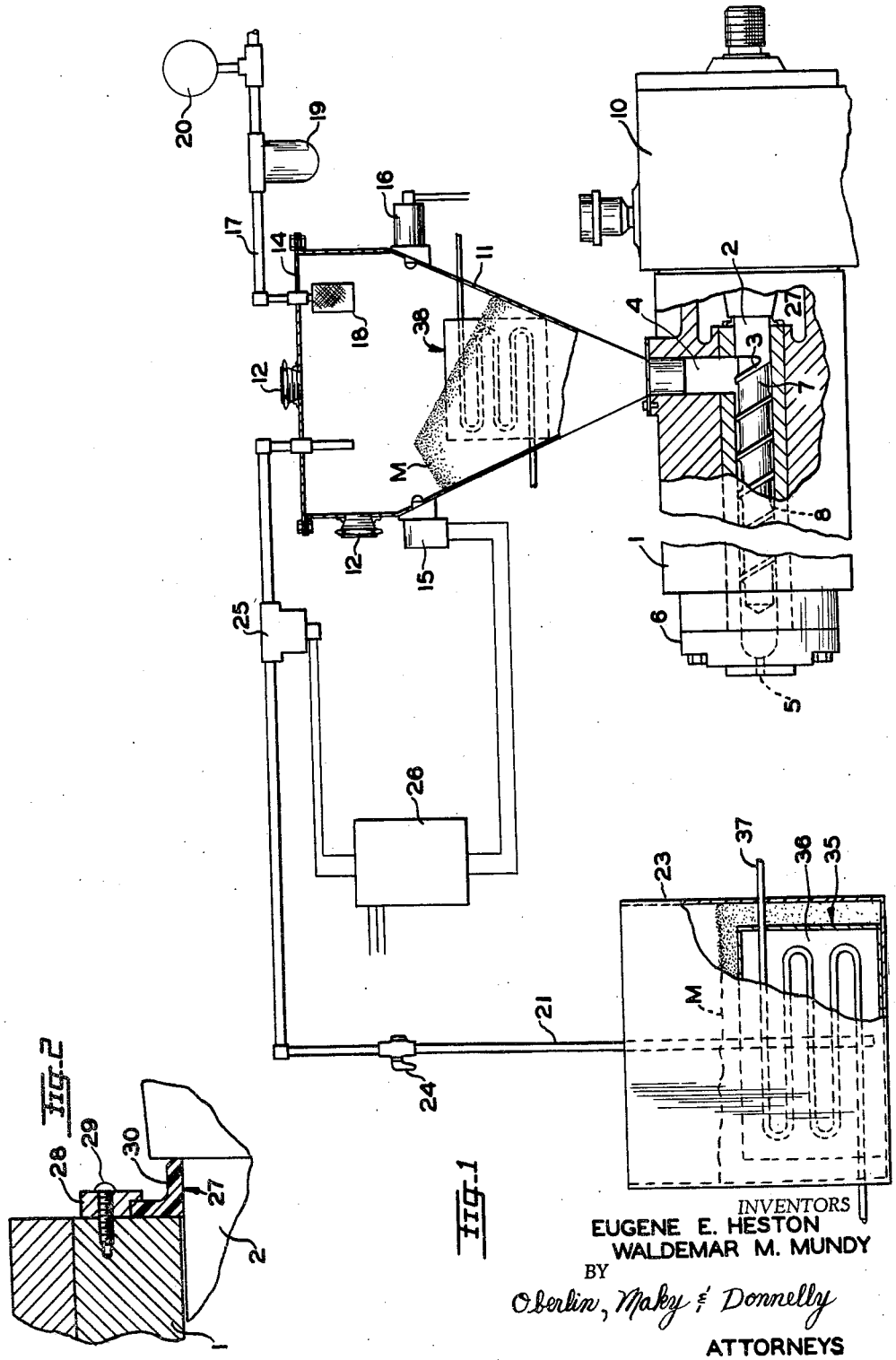

3,036,335
APPARATUS AND METHOD FOR EXTRUDING THERMOPLASTIC MATERIAL
Eugene E. Heston, Akron, and Waldemar M. Mundy, Cuyahoga Falls, Ohio, assignors to National Rubber Machinery Company, Akron, Ohio, a corporation of Ohio
Filed June 11, 1959, Ser. No. 819,725
7 Claims. (Cl. 18—12)

The present invention relates generally as indicated to an apparatus and method for extruding thermoplastic material, and more particularly to an extruder and extruding method by which a non-porous or non-cellular product may be extruded from solid particulate thermoplastic material that is fed into the extruder, the material being thus fed to the extruder in powder, granule, chip, pellet or like form.

Hitherto, it has been quite a problem in the extrusion of particulate thermoplastic material to extrude it in non-porous or non-cellular form, the problem being especially acute in connection with powdered or pulverulent thermoplastic materials. In the conventional screw type extruder, such pulverulent material is fed from a hopper into the feed opening of the extruder and the rotating feed screw advances the material toward the extruding opening. During the advance of the material, it is plasticized but despite the compression, smearing, and working of the material in the extruder, the product as it comes out of the extruding opening will be quite porous or multi-cellular with large cells or pockets toward the middle of the cross-section and with tiny cells in greater number near the periphery of the cross-section. Improvement in results has been achieved with extruders having vents or vacuum boxes along the length of the barrel to permit escape of or to draw out trapped gas pockets in the plasticized material as it is advanced by the feed screw. See, for example, the Reissue Patent No. 23,880 granted to Eugene E. Heston under date of September 28, 1954, wherein still further improvements are made possible by forcing the plasticized material to flow as a thin stream through a choke valve located at or just upstream from such vent or vacuum box.

In order to achieve the production of cell-less or pocket-less thermoplastic extrusions, it is an object of this invention to provide an extruder and extruding method in which the thermoplastic material is exposed to desired degree of vacuum while in solid, pulverulent form in the feed hopper and while being fed through the feed opening to the propelling section of the feed screw.

It is another object of this invention to provide an extruder and extruding method in which the plasticized material at the plasticizing section of the feed screw constitutes an effective fluid seal to leakage of air into the propelling section of the feed screw, or into the evacuated feed opening and feed hopper.

It is another object of this invention to provide an extruder and extruding method in which the vacuum chamber that is in communication with the feed opening and with the propelling section of the feed screw is effectively sealed not only by the plasticized material in the plasticizing section, but in addition, by a sealing ring at the rotary joint between the extruder barrel and the feed screw at a zone upstream from the propelling section and the feed opening.

It is another object of this invention to provide an extruder having a novel means and employing a novel method for supplying pulverulent thermoplastic material from an open container into the feed opening of the extruder.

It is yet another object of this invention to provide an extruder and method as aforesaid, embodying automatic means for maintaining a predetermined head of pulverulent thermoplastic material at the feed opening of the extruder.

It is yet another object of this invention to provide an extruder and method characterized in that there is but a negligible air current in the vacuum chamber, whereby the pulverulent material that is introduced into the vacuum chamber gently gravitates, without dust formation, to the propelling section of the feed screw.

It is still another object of this invention to provide an extruder and extruding method in which the thermoplastic material is exposed to vacuum while in solid, pulverulent form in the feed hopper and is in pre-heated condition in the hopper (by heating in the hopper and/or in the material supply drum) whereby the material is in dried and de-gassed condition when introduced into the extruder, the heated material also preventing condensation thereon of occluded gases and volatiles withdrawn from the body of pulverulent material and from the particles of material by the vacuum effect.

It is still another object of this invention to provide an extruder and method which, by reason of vacuum degassing of pre-heated material effects substantial saving in the equipment required since less working of the material is needed when preliminarily heated and de-gassed, substantially higher extrusion pressures are obtained due to earlier compaction and better working of the degassed material by the extruder, and substantially decreased degradation of the material when degassed material is heated and worked in the extruder, the latter being believed to be the result of lower oxygen content in the vacuum degassed material.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but a few of the various ways in which the principle of the invention may be employed.

In said annexed drawing:

The single FIGURE is a detail cross-section view of a fluid seal assembly for sealing the rotary joint between the feed screw and the barrel of the extruder at a zone upstream of the feed opening and propelling section.

Referring now more particularly to the drawing, the extruder herein comprises a barrel 1 in which the feed screw 2 is adapted to be rotated, said feed screw having a helical feeding rib 3 arranged to propel thermoplastic material supplied from the feed opening 4 through the barrel 1 and out through the extrusion opening 5 formed in the die assembly 6 secured at the end of the barrel 1. The portion of the feed screw which communicates with the feed opening 4 is the propelling section 7 and between the extrusion opening 5 and the feed opening 4, the feed screw and barrel define the plasticizing section 8 wherein the material is worked, smeared, compressed, and heated to melt it prior to being forced out through the extrusion opening 5.

The right-hand end of the barrel 1 as viewed in FIG. 1, is secured to a drive housing 10 and the feed screw 2 extends through said housing and may be provided with a threaded end as shown to which a swivel coupling may be secured for circulating temperature modifying medium through the feed screw. Within the housing 10 will be provided the usual motor driven gearing to effect rotation of the feed screw in a direction such that the material disposed around the hub of the feed screw will be advanced by feeding rib 3 toward the left from the feed opening 4 to the extrusion opening 5. Also as well-known in the art, the interior surface of the barrel 1 may be fluted, the feed screw may have a feeding rib 3 of changing pitch or lead, or the hub may be of changing diameter to effect desired working and compression of the material in the plasticizing zone or section 8.

If desired, portions along the length of the barrel 1 may be provided with vents or vacuum boxes as previously mentioned.

Connected at the feed opening 4 of the extruder is a funnel-shaped feed hopper 11 provided with windows 12 in the side and in the top cover 14 thereof and provided with oppositely disposed target and light source elements 15 and 16 of a photoelectric assembly for the control of the level of the pulverulent thermoplastic material M supplied into said hopper 11. As shown, the hopper 11 is closed at the top by means of the bolted-on cover 14 and a desired negative pressure is maintained in the hopper 11 by means of the suction tube 17 which is equipped with a filter 18 in the hopper itself and with another filter 19 and a vacuum gauge 20 exteriorly of the hopper, the outer end of the tube 17 leading to a vacuum pump or the like.

Also leading into the hopper 11 through the cover 14 thereof is a material feed line 21 through which pulverulent material M is drawn by vacuum into the hopper 11. The outer end of the feed line 21 is buried in an open drum 23 containing the pulverulent thermoplastic material M that is to be extruded. In said feed line 21 is a manually operated shut-off valve 24 and a solenoid valve 25, the latter being opened and closed by the photoelectric control unit 26 that is, in turn, controlled by the photo-cell or target element 15. The arrangement is preferably such that the solenoid valve 25 is closed whenever the top of the supply of thermoplastic material M in the hopper 11 reaches a level sufficiently high to cut off the light beam from the light source 16 to the target element 15. When that occurs, the control unit 26 will be energized to close the solenoid valve 25 to thereby prevent flow of thermoplastic material M into the hopper 11. When the level of the material M drops so that the light beam from source 16 strikes target element 15 the control unit 26 will be effective to open the solenoid valve to thereby permit more material M to flow into the hopper 11 under the influence of the suction in the hopper 11.

By maintaining a vacuum in the feed hopper 11 the pressure differential at opposite ends of the feed line 21 will effect drawing in of the pulverulent material M into the hopper 11. The material M will thus drop down in the hopper 11, and the entrained air will be drawn out by the vacuum. The degassed mass of pulverulent material M in the hopper 11 is then fed by gravity through the feed opening 4 to the propelling section 7 of the feed screw 2 from whence it will be advanced toward the left as viewed in FIG. 1 to the plasticizing section 8, whereat the material will be plasticized due to its being heated, worked, and compressed in that section of the extruder. The plasticized material, then, finally reaches the extrusion opening 5 in the die assembly 6 and is extruded therethrough. The extruded product will be found to be devoid of pockets or cells.

It is to be noted that the plasticized material M in the plasticizing section 8 of the extruder will constitute an effective air seal to prevent leakage of air into the propelling section 7, into the feed opening 4, and into the feed hopper 11. The rotary joint between the upstream end of the feed screw 2 and barrel 1, to the right of the feed opening 4, may be sealed against air leakage as by a packing ring 27 preferably made of tetrafluoethylene or like flexible material, which is suitable for that purpose and which can withstand the elevated temperatures which the barrel 1 and feed screw 2 may attain during normal operation. The packing ring 27 may be clamped in fluid-tight relation against the end of the barrel 1 as by means of a packing retainer 28 which is secured by screws 29 to the end of the barrel and said packing ring 27 preferably has an axially extending lip 30 which resiliently engages the outer surface of the feed screw 2. This sealing ring assembly prevents air leakage into the propelling section 7 of the extruder, into the feed opening 4, and into the feed hopper 11, whereby there will be no appreciable air currents in the feed hopper 11 to interfere with feed of material M to the propelling section 7 nor to cause dust formation in the hopper 11. Thus, the pulverulent material M simply descends gently by gravity from the lower end of the feed line 21 onto the accumulation of material in the feed hopper 11 and in so descending by gravity, the entrained air is effectively drawn out so as to produce an extruded product devoid of trapped air bubbles or cells.

As a matter of interest, it has been found that dry vinyl blend powder, for instance when fed into the extruder through an open hopper 11, will be extruded from the extrusion opening 5 with a multiplicity of gas pockets or cells throughout its cross-section with larger cells toward the center and smaller cells near the periphery. When the hopper 11 is closed and a vacuum of 10″ Hg. is maintained therein there will be approximately a 50% reduction in the number of pockets or cells in the extruded product and after longer exposure to vacuum there will be approximately 4 cells per ⅛ sq. inch. At a vacuum of 15″ Hg., the extruded product has only about one cell or pocket per ⅛ sq. inch. When the vacuum exceeds about 20″ Hg., no pockets or cells at all were visible in the extruded product.

By employing the level control assembly herein described, it is possible to maintain a substantially constant head of the pulverulent thermoplastic material M in the hopper 11, but, if desired, one may close the shut-off valve 24 when the hoper 11 is full and let the extruder run until the supply of material M is nearly depleted. This may be seen through the window 12 in the top cover 14. It is further contemplated to continuously degas a supply of pulverulent material M as it is fed through a conduit to the feed opening 4, and in this case, the rate of flow of the material M may be regulated to correspond with the rate of advance of the material by the propelling and plasticizing sections 7 and 8 of the feed screw.

Another significant feature of the present invention is the provision of a heat exchanger 35 in the supply drum 23 effective to pre-heat the material M so that it is introduced into the feed hopper 11 in heated condition whereby the vacuum will dry the material M and, to some extent, draw off volatile fractions in the material itself. The heat exchanger 35 may be of familiar form such as a plate coil which has opposite sides 36 of large area and a zigzag coil 37 therewithin. A heating media such as steam or hot water may be circulated through the coil 37.

In lieu of, or in addition to, the heat exchanger 35 there may be a similar heat exchanger 38 installed in the feed hoper 11 effective to pre-heat the material M therein for the same reasons aforesaid. Aside from the drying function of the pre-heating step, there results therefrom another important function and that is that the flow of entrained gases and volatiles through the body of material in the feed hopper 11 does not cause condensation of such gases on the particles of material, thereby greatly increasing the efficiency of the degassing and drying operations. Yet another significant improvement is that extruding pressure is greatly increased (by about 50% in some cases) while employing the simple form of extruder herein in conjunction with the instant vacuum degassing equipment.

By way of example, it has been found that many materials are effectively dried by heating them to a temperature of about 220° F., for example butyrates, styrenes, etc.

One advantage of pre-heating the material M in the drum 23 and/or in the feed hopper 11 is that devolatilization is accomplished without preliminary working by the feed screw 2 as contemplated in the two-stage extruder of Re. 23,880. Thus, the extruder is simplified and those materials M which cannot stand much working can be effectively devolatilized.

The heat exchangers 35 and 38 are adapted to cool the material M by circulating cooling media such as cold water, brine or other refrigerants through the coil 37. This is desirable in those cases where the material exhibits unstable characteristics in the initial stages of processing and must be at a low temperature at the time it is fed into the extruder.

Other modes of applying the principle of the invention may be employed, change being made as regards the details described, provided the features stated in any of the following claims, or the equivalent of such, be employed.

We therefore particularly point out and distinctly claim as our invention:

1. A screw-type extruder for pulverulent thermoplastic material comprising a barrel having a feed opening for such material and an extrusion opening; a feed screw rotatable in said barrel and providing a propelling section to advance pulverulent thermoplastic material from said feed opening toward said extrusion opening and a plasticizing section effective to plasticize such material as it advances to said extrusion opening; means for heating the material before it enters said extruder through said feed opening; a vacuum feed hopper having an outlet in communication with said feed opening whereby particulate pre-heated material in said hoper is exposed to vacuum for withdrawal of gases therefrom and to withdraw volatiles from the material so as to produce from the plasticized material an extrusion devoid of gas cells or pockets; and valve-controlled supply means to control the supply of such pulverulent material to said feed opening; said supply means comprising a supply line through which such material is supplied into said hopper at a point above said outlet, a valve in said supply line, and means effective to open and to close said valve according to the level of material in said hopper.

2. The extruder of claim 1 wherein a packing ring in fluid-tight sealing contact with said barrel and with said feed screw upstream of said feed opening is effective, in conjunction with the plasticized material downstream of said feed opening, to preclude ingress of air into said feed opening.

3. A method of continuously producing cell-less extrusions from pulverulent thermoplastic material which comprises the steps of drawing such pulverulent material by vacuum to the feed opening of an extruder, exposing the material to vacuum, pre-heating the material so that it is dried when exposed to vacuum, plasticizing the thus vacuum-degassed and dried pre-heated material by application of additional heat and of pressure thereon, and extruding the degassed and plasticized material through the extrusion opening of the extruder.

4. A screw-type extruder for pulverulent thermoplastic material comprising a barrel having a feed opening for such material and an extrusion opening; a feed screw rotatable in said barrel and providing a propelling section to advance pulverulent thermoplastic material from said feed opening toward said extrusion opening and a plasticizing section effective to plasticize such material as it advances to said extrusion opening; a vacuum feed hopper disposed above said barrel and having an inlet at the top above the level of material therein having an outlet at the bottom in communication with said feed opening whereby particulate material while dropping from said inlet and while in said hopper is exposed to vacuum for withdrawal of gases therefrom so as to produce from the plasticized material an extrusion devoid of gas cells or pockets, said hopper having an inlet at the top above the level of pulverulent material in said hopper, and a valve-controlled supply line leading from a container of pulverulent material to such hopper inlet whereby such material is drawn through said line from said container into said hopper by the vacuum in said hopper and drops down from said inlet so that the material is effectively degassed at that time and while it is in said hopper and in said propelling section.

5. The extruder of claim 4 wherein a packing ring in fluid-tight sealing contact with said barrel and with said feed screw upstream of said feed opening is effective, in conjunction with the plasticized material downstream of said feed opening, to preclude ingress of air into said feed opening.

6. A feed device for an extruder comprising a vacuum feed hopper having an outlet at the bottom adapted to be secured to the feed opening of an extruder and an inlet at the top through which pulverulent plastic material is adapted to be supplied into said hopper for degassing while dropping downwardly in said hopper and while in said hopper, and a valve-controlled supply line through which such material is drawn into said hopper through said inlet by the vacuum in said feed hopper, an end of said supply line being buried in an open container of such material below said feed hopper whereby such material is drawn upwardly through said line into said hopper when said valve is open by the vacuum in said hopper.

7. A method of continuously producing cell-less extrusions from pulverulent thermoplastic material which comprises the steps of pre-heating such pulverulent material to a temperature effective to preliminarily dry the same, drawing such pre-heated pulverulent material by vacuum into a vacuum feed hopper, exposing the pre-heated pulverulent material to vacuum while continuing to heat the dried material in said hopper to continue the drying thereof and the withdrawal of volatiles therefrom without condensation on the material, maintaining a predetermined level of material in said hopper, feeding the vacuum-degassed and dried preheated material to the feed opening of an extruder without exposure to the atmosphere, plasticizing the thus vacuum degassed and dried pre-heated material by application of additional heat and of pressure thereon, and extruding the degassed and plasticized material through the extrusion opening of the extruder.

References Cited in the file of this patent

UNITED STATES PATENTS

| | | |
|---|---|---|
| 1,842,919 | Simmons | Jan. 26, 1932 |
| 2,078,565 | Durst et al. | Apr. 27, 1937 |
| 2,308,971 | Carter | Jan. 19, 1943 |
| 2,568,332 | Genovese | Sept. 18, 1951 |
| 2,604,659 | Eppler | July 29, 1952 |
| 2,799,047 | Widiger et al. | July 16, 1957 |
| 2,938,639 | Boyd | May 31, 1960 |

FOREIGN PATENTS

| | | |
|---|---|---|
| 449,472 | Canada | June 29, 1948 |